J. GARDNER.
CONNECTING ROD.
APPLICATION FILED MAR. 20, 1918.

1,313,684.

Patented Aug. 19, 1919.

WITNESSES
George C. Myers.

INVENTOR
JOSEPH GARDNER,
BY Munn & Co.
ATTORNEYS

UNITED STATES PATENT OFFICE.

JOSEPH GARDNER, OF TUCUMCARI, NEW MEXICO.

CONNECTING-ROD.

1,313,684.  Specification of Letters Patent.  Patented Aug. 19, 1919.

Application filed March 20, 1918. Serial No. 223,544.

*To all whom it may concern:*

Be it known that I, JOSEPH GARDNER, a citizen of the United States, and a resident of Tucumcari, in the county of Quay and State of New Mexico, have invented certain new and useful Improvements in Connecting-Rods, of which the following is a specification.

My invention is an improvement in connecting rods, and has for its object to provide a rod of the character specified especially adapted for internal combustion and other engines, for connecting the pistons with the crank shafts, wherein the arrangement is such that the rod cannot become disconnected from the shaft and may be adjusted to compensate for wear.

Figure 1:
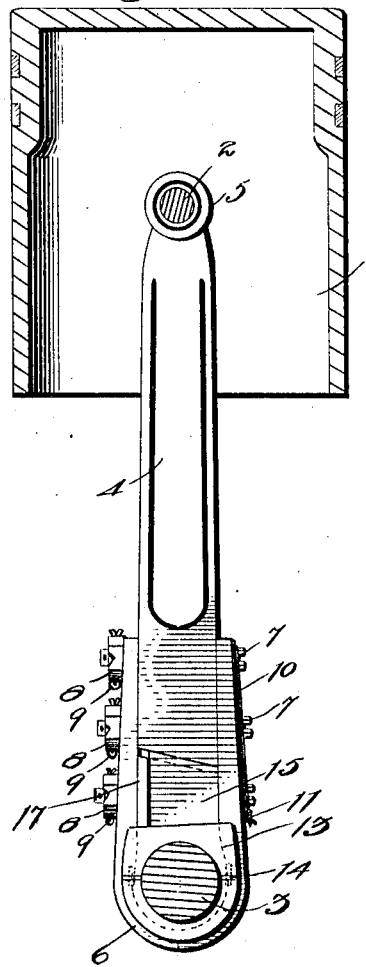
Figure 1 is a longitudinal section through a piston provided with the improved connecting rod.
Figure 5:
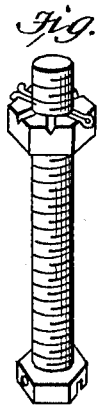
Fig. 5 is a perspective view of one of the bolts.

The present embodiment of the invention is shown in connection with the piston 1 of an engine, the improved connecting rod being arranged between the pin 2 of the piston and the crank shaft 3, and connecting the said pin with the crank shaft.

The connecting rod 4 has a bearing 5 at one end for engaging the pin 2, and at the other end a yoke 6 is provided for connecting the said end to the crank shaft 3. This yoke is arranged with the body embracing the crank shaft and with the arms of the yoke on opposite sides of the adjacent end of the connecting rod, and the arms of the yoke are connected to the rod by two bolts 7, the said bolts having kerfed heads for engagement by a screw driver or the like. A third bolt 7 of the same construction is provided for connecting the wedge, to be later described, to the yoke.

Each of these bolts 7 is engaged by a nut 8 at the opposite end from the head, and each nut is locked to the bolt by means of a cotter pin 9, which is passed through registering openings in the nut and in the bolt. The heads of the bolts have diametrical openings which are adapted to aline to receive a wire 10 for locking all the bolts together. This wire is passed through the registering openings and the ends are connected, as shown at 11, by twisting them together.

The bolts 7, except that which passes through the wedge, are threaded through that arm of the yoke remote from the head of the bolt, and pass loosely through the openings in the connecting rod. A sectional bushing, consisting of sections 12 and 13, is arranged between the crank shaft of the yoke, the said sections being shaped to fit between the parts, and shims 14 are arranged between the abutting edges of the sections. These shims are held in place by means of pins 18 which pass through openings in the shims and engage registering openings in the bushing sections. When desired, the shims may be removed and be replaced by smaller shims to compensate for wear.

Figure 2:
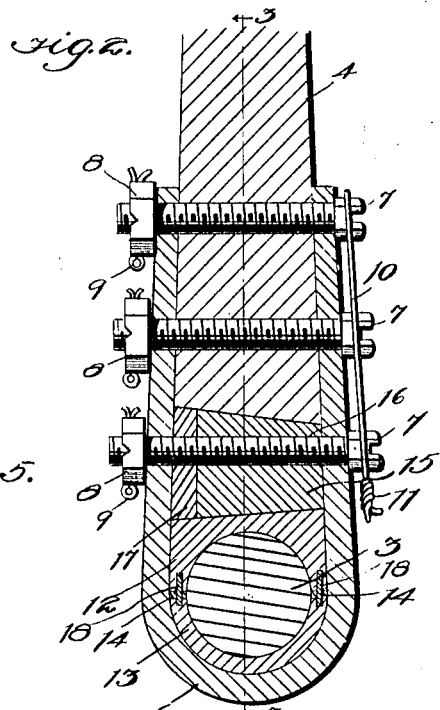
Fig. 2 is a section transverse to the crank shaft through one end of the connecting rod.

Referring particularly to Fig. 2, it will be noticed that the adjacent ends of the connecting rod 4 and of the section 12 of the bearing are inclined in opposite directions, and they are spaced apart from each other far enough to receive between them a wedge 15 which has a longitudinally extending threaded opening 16 for engagement by the bolt 7 at this point. The bolt has threaded engagement with the screw, but turns loosely in the openings of the yoke arms, and it will be evident that by turning the bolt the wedge may be moved laterally with respect to the connecting rod.

A plate 17 is arranged between the large end of the wedge and the adjacent end of the yoke, and when the parts become worn the wedge may be moved laterally in the direction in which its small end points to compensate for wear. If necessary, the small end of the wedge may be ground away to permit this movement, and an additional filling plate or plates 17 arranged between the large end of the wedge and the adjacent end of the yoke for filling the space between the said large end and the yoke arm.

Figure 3:
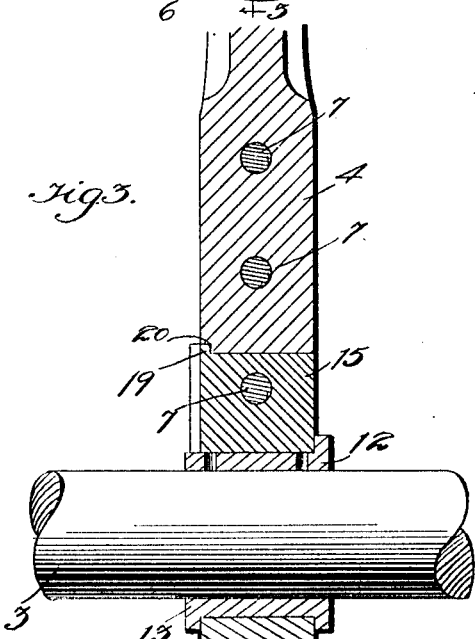
Fig. 3 is a section on the line 3—3 of Fig. 2, looking in the direction of the arrows adjacent the line.
Figure 4:
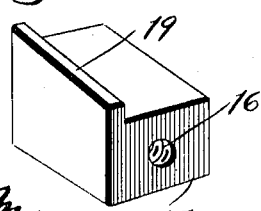
Fig. 4 is a perspective view of the wedge.

Referring to Fig. 3, it will be noticed that the wedge on that side wall adjacent to the body of the connecting rod has a rib 19 at one face thereof, and the connecting rod has a rabbet 20 for engagement by the rib.

Referring to Figs. 1 and 3, it will be noticed that the bushing sections 12 and 13 have annular flanges at their ends for engaging the yoke and the wedge to prevent movement of the said sections longitudinally of the crank shaft. At the wedge this flange is cut away as shown more particularly in Fig. 3, to permit the insertion and removal of the wedge. In order to disassemble this connection, the cotter pins 9 are removed from the two bolts 7 remote from the wedge. Afterward, the wire 10 is removed, and the bolts 7 are now turned out, and it will be evident that the body of the rod 4 may be detached from the yoke. To permit the removal of the bearing sections the remaining bolt 7 is detached, being threaded out from the wedge and the yoke.

In assembling the parts, after the two bolts remote from the crank shaft have been connected, with the wedge 15 in place, the small plates 17 and 18 are placed, after which the bolt 7 is threaded through the wedge and the nut 8 is attached thereto. The cotter pins and the wire 10 are afterward placed, and the parts are securely connected. Should a nut become loose, the bolts cannot become loose since they cannot turn until the wire 10 is removed. The rib 19 and the rabbet 20 serve as a guide for the proper placing of the wedge. It will be noted from an inspection of Fig. 3 that the bearing section 12 has oil holes adjacent to the wedge.

The bolts 7 have hexagonal heads and the nuts which engage the said bolts are hexagonal, having grooves extending in three different directions for receiving the cotter pins. It will be noticed that the bushing section 12 is somewhat thicker than the bushing 13, to provide for wear, since this section of the bushing receives the principal part of the wear, and by this arrangement this bushing will last as long as the section 13. When the wedge is moved plates 17 of larger size may be inserted.

I claim:

1. A connecting rod for connecting pistons to crank shafts comprising a rod body, a yoke comprising a body embracing the crank shaft and arms extending on opposite sides of the rod, said arms and rod body having registering openings, and the openings in one arm being threaded, a sectional bearing between the crank shaft and the yoke, the end of the rod adjacent to the crank shaft and the adjacent face of the adjacent bearing being beveled in opposite directions, a wedge fitting between the beveled faces, said wedge having a threaded opening registering with the adjacent openings of the arms of the yoke, a bolt threaded through the wedge and engaging the yoke openings, the heads of the bolts having registering openings for receiving a wire to prevent turning thereof, a wire engaging the openings, a nut engaging each bolt, and a cotter pin connecting each nut to the bolt.

2. A connecting rod for connecting pistons to crank shafts comprising a rod body, a yoke comprising a body embracing the crank shaft and arms extending on opposite sides of the rod, said arms and rod body having registering openings, and the openings in one arm being threaded, a sectional bearing between the crank shaft and the yoke, the end of the rod adjacent to the crank shaft and the adjacent face of the adjacent bearing being beveled in opposite directions, a wedge fitting between the beveled faces, said wedge having a threaded opening registering with the adjacent openings of the arms of the yoke, a bolt threaded through the wedge and engaging the yoke openings, the heads of the bolts having registering openings, and a wire engaging the said openings to prevent turning of said bolts.

JOSEPH GARDNER.

Copies of this patent may be obtained for five cents each, by addressing the "Commissioner of Patents, Washington, D. C."